May 22, 1951          H. E. HODGSON          2,554,330
TRANSVERSELY MOVABLE BRAKE MECHANISM
Filed Sept. 5, 1947
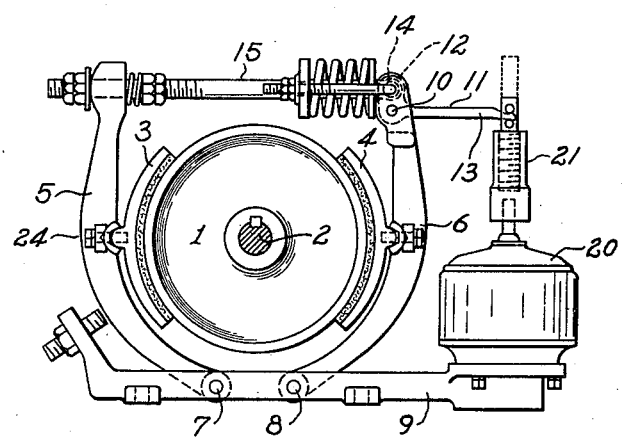
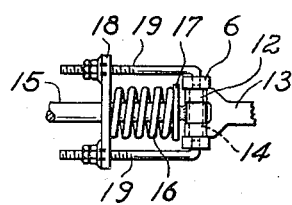
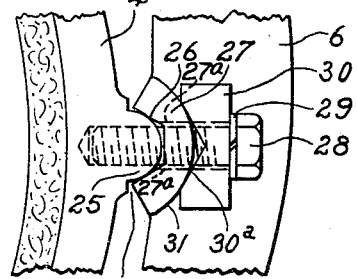
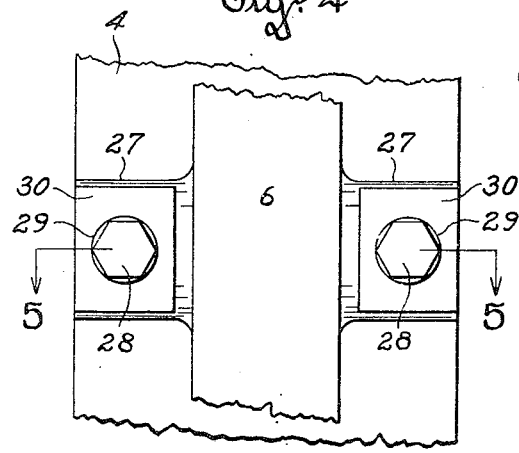
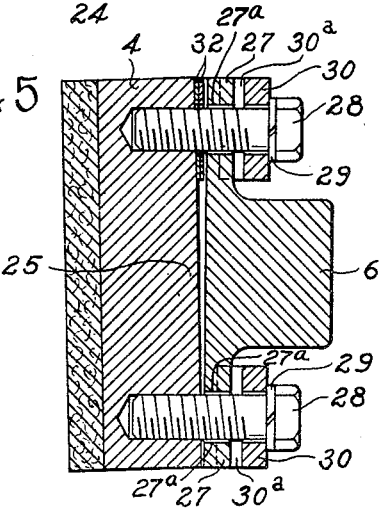
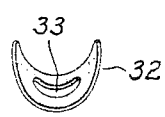

Patented May 22, 1951

2,554,330

UNITED STATES PATENT OFFICE 2,554,330

TRANSVERSELY MOVABLE BRAKE MECHANISM

Howard E. Hodgson, Wauwatosa, Wis., assignor to Cutler-Hammer, Inc., Milwaukee, Wis., a corporation of Delaware Application September 5, 1947, Serial No. 772,443

5 Claims. (Cl. 188—75)

This invention relates to brake mechanisms and is particularly applicable to brakes of the type including a brake wheel for mounting upon the shaft of a motor or other device to be braked and a pair of releasable brake shoes for frictionally engaging opposite sides of the brake wheel.

The invention has among its objects to provide an improved shoe mounting for brakes of the aforesaid type which simplifies and facilitates adjustment of the shoes for accurate alinement thereof with the peripheral face of the brake wheel and also enables ready removal and replacement of the shoes without derangement or disconnection of other parts of the brake mechanism.

Another object is to provide a shoe mounting for brakes of the aforesaid type which insures against shifting or play of the shoes with respect to their associated supporting parts so that the brake may be set to operate with a minimum amount of clearance between the shoes and the brake wheel.

Another object is to provide a shoe mounting for brakes of the aforesaid type which is exceedingly simple and rugged in construction and which consists of a small number of parts which can be readily machined and assembled at low cost.

Various other objects and advantages of the invention will hereinafter appear.

The accompanying drawing illustrates an embodiment of the invention which will now be described, it being understood that various modifications may be made in the embodiment illustrated without departing from the spirit and scope of the appended claims.

In the drawing,

Figure 1 is an end elevational view of a brake embodying the invention;

Fig. 2 is a fragmentary top view of certain parts of the brake operating mechanism illustrated in Fig. 1;

Fig. 3 is an enlarged end elevational view of one of the brake shoe mountings illustrated in Fig. 1;

Fig. 4 is a fragmentary side elevational view of the brake shoe mounting illustrated in Fig. 3;

Fig. 5 is a sectional view on line 5—5 of Fig. 4, and Fig. 6 is a perspective view of an adjusting shim illustrated in section in Fig. 5.

Referring to Fig. 1, a shoe mounting embodying the invention is illustrated in connection with a brake of the type disclosed in the patent to A. E. Lillquist, No. 2,257,611, issued September 30, 1941. Briefly described this brake comprises a brake wheel 1 to be fixed to the drive shaft 2 of a motor or other device which is to be braked, and a pair of brake shoes 3 and 4 for frictionally engaging said wheel on opposite sides. The brake shoes 3 and 4 are carried by vertically disposed levers 5 and 6, respectively, and the lower ends of said levers are pivotally supported upon pins 7 and 8, respectively, on a base plate 9. Lever 6 has a pivot pin 10 mounted adjacent the upper end thereof which carries an operating lever 11 having a vertically disposed arm 12 and a horizontally disposed arm 13. The upper end of arm 12 is pivotally connected by a pin 14 (Fig. 2) to one end of a rod 15 and the opposite end of said rod is attached to the upper end of lever 5. As shown in Fig. 2 rod 15 carries a spring 16 which is held under compression between a collar 17 fixed to said rod and an abutment plate 18. Plate 18 is slidable on rod 15 and as shown in Fig. 2 the same is connected to the upper end of lever 6 by a pair of pull rods 19. Spring 16 operates through the medium of rod 15 and pull rods 19 to bias levers 5 and 6 toward each other so that the brake shoes 3 and 4 are normally held in frictional engagement with the periphery of wheel 1. Upon upward movement of the arm 13 of lever 11 out of the position shown in Fig. 1 levers 5 and 6 are operated against the action of spring 16 to disengage brake shoes 3 and 4 from brake wheel 1.

The above described brake mechanism is provided with a vertically disposed operating motor 20 which is mounted upon base plate 9 and is operatively connected to the free end of arm 13 by a screw jack 21. When motor 20 is energized screw jack 21 operates to move arm 13 upwardly against the action of spring 16 for release of the brake. Upon deenergization of motor 20 arm 13 and screw jack 21 are returned by spring 16 to the position shown in Fig. 1 for setting of the brake. The screw jack 21 may be of the type disclosed in the Hodgson Patent No. 2,127,335, granted August 16, 1938.

In accordance with the present invention each of the brake shoes 3 and 4 is supported upon its associated lever by an open pivotal bearing connection 24 comprising a transverse bearing projection 25 of semi-cylindrical shape which is formed on the shoe at a point midway between the ends thereof and a V-shaped recess 26 formed on the inner side of the lever to receive said bearing projection. As shown in Fig. 4 each of the levers 5 and 6 has a pair of lugs 27—27 formed on opposite sides thereof, and each of the brake shoes 3 and 4 is secured to its associated lever by a pair of cap screws 28—28 which extend loosely through openings 27ª in said lugs into tapped openings in bearing projection 25. As will be apparent from the drawings (Figs. 3 and 5) openings 27ª are of larger diameter than screws 28, thereby permitting angular displacement of said screws within said openings. Each of the cap screws 28 has a lock washer 29 and a clamping member 30 interposed between the head thereof and its associated lug 27 and as shown in Fig. 3 each of said clamping members is provided with a V-shaped face 30ª which engages a circular face 31 formed on the front side of its associated lug 27.

As is apparent, the aforedescribed open pivotal bearing connections 24 permit angular adjustment of shoes 3 and 4 in a vertical plane with respect to their associated levers 5 and 6. Proper setting of the brake shoes in this plane is obtained by merely loosening the securing screws 28 when the brake is in set position. The open pivotal bearing connections 24 then permit shoes 3 and 4 to adjust themselves upon the peripheral surface of brake wheel 1 so that the faces thereof assume a position concentric to the axis of said wheel. Upon tightening of screws 28 bearing projections 25 on the brake shoes are drawn into their associated recesses 26 and clamping members 30 are drawn against the faces 31 of their associated lugs 27 to securely hold the brake shoes in adjusted position upon their associated levers when the brake is released.

In connection with the foregoing it should be noted that the above described brake shoe mounting insures against lost motion of the brake shoes with respect to their associated levers so that the brake can be set to operate properly with an exceedingly small amount of clearance between the brake shoes and brake wheel 1. Also it should be noted that upon removal of screws 28 bearing projections 25 are slidable axially within their associated recesses 26 so that brake shoes 3 and 4 are removable from levers 5 and 6 by lateral movement only with respect thereto.

In some instances it is necessary to adjust one or both of the brake shoes 3 and 4 with respect to their associated levers 5 and 6 in order to obtain transverse alinement of the faces of the shoes with respect to the peripheral face of brake wheel 1. As shown in Fig. 5 this adjustment is obtained by means of shims 32 which are insertable into either end of the recesses 26 in levers 5 and 6 to locate bearing projections 25 in a horizontal plane within said recesses so that the faces of the shoes are brought into transverse alinement with the face of brake wheel 1. As shown in Fig. 5, each of the shims 32 comprises a curved sheet metal stamping having an opening 33 for receiving the securing screw 28 on the end of the bearing projection 25 with which the same is associated. Upon tightening of screws 28, shims 32 are drawn into their associated recesses 26 and conform to the curved surface on their associated bearing projections 25.

As is apparent, the above described brake shoe mounting construction can be modified if desired by reversing the open pivotal bearing connections so that bearing projections 25 are formed on the brake levers 5 and 6 and recesses 26 are formed in the outer faces of brake shoes 3 and 4.

What I claim as new and desire to secure by Letters Patent is:

1. In a brake mechanism, the combination with a brake wheel and a brake shoe for frictionally engaging the periphery thereof, of a pivoted operating lever for said shoe, said shoe and said lever being provided with elongated interfitting bearing parts which extend transversely between opposite sides of said shoe to permit angular adjustment thereof with respect to said lever in a plane at right angles to the axis of said wheel, a shim adjustment associated with said bearing parts insertable therebetween to adjust said shoe with respect to said lever in a plane at right angles to said former plane, and a pair of securing screws extending through openings in opposite sides of said operating lever and threaded into said shoe to draw said bearing parts into tight engagement with said shim adjustment therebetween for securement of said shoe in adjusted position upon said lever.

2. In a brake mechanism, the combination with a brake wheel and a cooperating brake shoe for frictionally engaging the periphery thereof, of a pivoted operating lever for said shoe, said lever having an opening therein, and connections between said shoe and said lever permitting removal of said shoe from said lever while the latter and said wheel remain in operative relationship, said connections comprising elongated interfitting bearing parts on said shoe and said lever respectively permitting angular adjustment of said shoe with respect to said lever in a plane at right angles to the axis of said wheel, and means for retaining said shoe in preselected angular relationship to said lever, said last mentioned means comprising a screw extending loosely through said opening in said lever and threaded into a tapped opening in the aforementioned bearing part on said shoe, said screw being angularly displaceable within said lever opening, and a clamping member engaging said screw lever for holding said screw in a predetermined angular position within said lever opening.

3. In a brake mechanism, the combination with a brake wheel and a cooperating brake shoe for frictionally engaging the periphery thereof, of a pivoted operating lever for said shoe, said lever having an opening therein, and connections between said shoe and said lever permitting removal of said shoe from said lever while said lever and said wheel remain in operative relationship, said connections comprising elongated interfitting bearing parts on said shoe and said lever respectively which extend transversely between opposite sides of said shoe to afford removal of said shoe from said lever by lateral movement only and which permit angular adjustment therebetween in a plane at right angles to the axis of said wheel, and means for retaining said shoe in a preselected angular relationship to said lever, said last mentioned means comprising a screw extending loosely through said opening in said lever and between said interfitting bearing parts for holding the same in tight engagement to maintain said shoe in adjusted position on said lever, said screw being angularly displaceable within said lever opening, and a clamping member engaging said lever to hold said screw in a predetermined angular position within said lever opening.

4. In a brake mechanism, the combination with a brake wheel and a cooperating shoe for frictionally engaging the periphery thereof, of a pivoted operating lever for said shoe, said lever having an opening therein, said shoe and said lever having interfitting bearing parts affording the sole connection therebetween, said bearing parts comprising an elongated projection of semi-cylindrical shape extending transversely between opposite sides of said shoe and a cooperating open pivotal bearing recess affording angular adjustment of said shoe with respect to said lever and affording removal of said shoe from said lever by lateral movement only while said lever and said wheel remain in operative relationship, and means for retaining said shoe in a preselected angular relationship to said lever, said means comprising a screw extending loosely through said opening in said lever and between said bearing parts to hold the same in tight engagement, said screw being angularly displaceable within said opening, and clamping means for holding said screw in a predetermined angular position within said lever opening.

5. In a brake mechanism, the combination with a brake wheel and a cooperating shoe for frictionally engaging the periphery thereof, of a pivoted operating lever for said shoe, said lever having openings therein on opposite sides thereof, said shoe and said lever having interfitting bearing parts affording the sole connection therebetween, said bearing parts comprising an elongated projection of semi-cylindrical shape extending transversely between opposite sides of said shoe and a cooperating open pivotal recess in said lever affording angular adjustment of said shoe with respect to said lever and affording removal of said shoe from said lever by lateral movement only while said lever and said wheel remain in operative relationship, and means for retaining said shoe and said lever in a preselected angular relationship in a plane at right angles to the axis of said wheel, said means comprising a pair of screws extending loosely through said openings on opposite sides of said lever and being threaded into said bearing projection to draw the latter into said bearing recess for tight engagement of said bearing parts, said screws being angularly displaceable within their respective lever openings, and a clamping member interposed between the head of each of said screws and said lever for frictionally engaging the latter to hold said screws in predetermined angular positions within the respective lever openings.

HOWARD E. HODGSON.

REFERENCES CITED

The following references are of record in the file of this patent:

UNITED STATES PATENTS

| Number | Name | Date |
|---|---|---|
| 925,304 | Cummings | June 15, 1909 |
| 1,102,523 | Lindquist et al. | July 7, 1914 |
| 1,459,304 | Huff | June 19, 1923 |
| 2,289,107 | Eames | July 7, 1942 |

FOREIGN PATENTS

| Number | Country | Date |
|---|---|---|
| 245,121 | Italy | Feb. 18, 1926 |